United States Patent
Hoelscher et al.

(10) Patent No.: US 10,482,621 B2
(45) Date of Patent: Nov. 19, 2019

(54) SYSTEM AND METHOD FOR IMPROVED SCORING OF 3D POSES AND SPURIOUS POINT REMOVAL IN 3D IMAGE DATA

(71) Applicant: Cognex Corporation, Natick, MA (US)

(72) Inventors: Andrew Hoelscher, Somerville, MA (US); Aaron S. Wallack, Natick, MA (US); Adam Wagman, Stow, MA (US); David J. Michael, Wayland, MA (US); Hongjun Jia, Hopkinton, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/654,793

(22) Filed: Jul. 20, 2017

(65) Prior Publication Data

US 2018/0130224 A1    May 10, 2018

Related U.S. Application Data

(60) Provisional application No. 62/369,709, filed on Aug. 1, 2016.

(51) Int. Cl.
*G06K 9/00* (2006.01)
*G06T 7/70* (2017.01)
(Continued)

(52) U.S. Cl.
CPC ............ *G06T 7/70* (2017.01); *G06K 9/00214* (2013.01); *G06N 20/00* (2019.01); *G06T 7/001* (2013.01);
(Continued)

(58) Field of Classification Search
CPC combination set(s) only.
See application file for complete search history.

(56) References Cited

U.S. PATENT DOCUMENTS

| 6,246,468 B1 | 6/2001 | Dimsdale |
| 6,297,844 B1 | 10/2001 | Schatz et al. |

(Continued)

FOREIGN PATENT DOCUMENTS

| CN | 102308320 A | 1/2012 |
| EP | 3131060 A1 | 2/2017 |

(Continued)

OTHER PUBLICATIONS

Bhotika et al., "A Probabilistic Theory of Occupancy and Emptiness", Apr. 29, 2002, Published in: USA.
(Continued)

*Primary Examiner* — Bhavesh M Mehta
*Assistant Examiner* — Ian L Lemieux
(74) *Attorney, Agent, or Firm* — Loginov IP

(57) ABSTRACT

This invention provides a system and method for estimating match of a 3D alignment pose of a runtime 3D point cloud relative to a trained model 3D point cloud. It includes scoring a match of a candidate pose of the runtime 3D point cloud relative to the trained model 3D point cloud, including a visibility check that comprises (a) receiving a 3D camera optical center (b) receiving the trained model 3D point cloud; (c) receiving the runtime 3D point cloud; and (d) constructing a plurality of line segments from the optical center to a plurality of 3D points in the 3D point cloud at the runtime candidate pose. A system and method for determining an accurate representation of a 3D imaged object by omitting spurious points from a composite point cloud based on the presence or absence of such points in a given number of point clouds is also provided.

20 Claims, 13 Drawing Sheets

(51) Int. Cl.
*G06N 20/00* (2019.01)
*G06T 17/20* (2006.01)
*G06T 19/00* (2011.01)
*G06T 7/00* (2017.01)
*G06T 7/30* (2017.01)

(52) U.S. Cl.
CPC ............... *G06T 7/30* (2017.01); *G06T 17/20* (2013.01); *G06T 19/00* (2013.01); *G06T 2207/10012* (2013.01); *G06T 2207/10028* (2013.01); *G06T 2207/20081* (2013.01); *G06T 2207/30164* (2013.01); *G06T 2207/30244* (2013.01)

(56) References Cited

U.S. PATENT DOCUMENTS

| | | | |
|---|---|---|---|
| 6,420,698 | B1 | 7/2002 | Dimsdale |
| 8,111,904 | B2 * | 2/2012 | Wallack ................ G06K 9/209 382/152 |
| 8,126,260 | B2 * | 2/2012 | Wallack ................ G06K 9/32 382/154 |
| 8,442,304 | B2 * | 5/2013 | Marrion ............... G06K 9/6211 382/154 |
| 2005/0074162 | A1 * | 4/2005 | Tu ........................ G06T 7/80 382/154 |
| 2005/0140670 | A1 | 6/2005 | Wu et al. |
| 2007/0280528 | A1 | 12/2007 | Wellington et al. |
| 2008/0298672 | A1 * | 12/2008 | Wallack ................ G06K 9/32 382/154 |
| 2009/0190798 | A1 | 7/2009 | Lee et al. |
| 2010/0111370 | A1 * | 5/2010 | Black ................. G06K 9/00369 382/111 |
| 2010/0166294 | A1 | 7/2010 | Marrion et al. |
| 2012/0182392 | A1 | 7/2012 | Kearns et al. |
| 2013/0155058 | A1 | 6/2013 | Golparvar-Fard et al. |
| 2013/0223673 | A1 | 8/2013 | Davis et al. |
| 2013/0236089 | A1 | 9/2013 | Litvak et al. |
| 2014/0043329 | A1 | 2/2014 | Wang et al. |
| 2014/0267614 | A1 | 9/2014 | Ding et al. |
| 2015/0279118 | A1 | 10/2015 | Dou et al. |
| 2015/0301592 | A1 | 10/2015 | Miller |
| 2016/0125637 | A1 * | 5/2016 | Hyllus ................... G06T 17/00 382/154 |
| 2016/0210751 | A1 * | 7/2016 | Feng .................... G06K 9/4652 |
| 2017/0140537 | A1 | 5/2017 | Jia et al. |
| 2019/0088004 | A1 * | 3/2019 | Lucas ................... G06T 15/08 |

FOREIGN PATENT DOCUMENTS

| | | |
|---|---|---|
| JP | 2007271408 A | 10/2007 |
| JP | 2007322351 A | 12/2007 |
| JP | 2009025225 A | 2/2009 |
| JP | 2015197312 A | 11/2015 |

OTHER PUBLICATIONS

Hernandez et al, "Probabilistic Visibility for Multi-View Stereo", Nov. 27, 2006, pp. 1-12, Published in: USA.

* cited by examiner

FULL MODEL

SINGLE-VIEW
RUNTIME

BEST MATCH

TOTALLY VISIBLE POINT
(CONTRIBUTES TO
EVALUATION OF POSE)

SYSTEM AND METHOD FOR IMPROVED SCORING OF 3D POSES AND SPURIOUS POINT REMOVAL IN 3D IMAGE DATA

RELATED APPLICATION

This application claims the benefit of U.S. patent application Ser. No. 62/369,709, entitled SYSTEM AND METHOD FOR IMPROVED SCORING OF 3D POSES IN THE PRESENCE OF PARTIAL VIEWS AND SELF-OCCLUSIONS IN A VISION SYSTEM, filed Aug. 1, 2016, the teachings of which are incorporated herein by reference.

FIELD OF THE INVENTION

This invention relates to machine vision systems and more particularly to vision systems that identify and align three-dimensional (3D) image features with respect to a trained 3D pattern.

BACKGROUND OF THE INVENTION

Machine vision systems, also termed "vision systems" herein, are used to perform a variety of tasks in a manufacturing environment. In general, a vision system consists of one or more camera assemblies with an image sensor (or "imager") that acquires grayscale or color images of a scene that contains an object under manufacture. Images of the object can be analyzed to provide data/information to users and associated manufacturing processes. The data produced by the camera is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well-known PatMax® system commercially available from Cognex Corporation of Natick, Mass., compare features in a two-dimensional (2D) image of a scene to a trained (using an actual or synthetic model) 2D pattern, and determine the presence/absence and pose of the 2D pattern in the 2D imaged scene. This information can be used in subsequent inspection (or other operations) to search for defects and/or perform other operations, such as part rejection.

A particular task employing vision systems is the alignment of a three-dimensional (3D) target shape during runtime based upon a trained 3D model shape. 3D cameras can be based on a variety of technologies—for example, a laser displacement sensor (profiler), a stereoscopic camera, a sonar, laser or LIDAR range-finding camera, time-of-flight sensor, and a variety of other passive or active range-sensing technologies. Such cameras produce a range image wherein an array of image pixels (typically characterized as positions along orthogonal x and y axes) is produced that also contains a third (height) dimension for each pixel (typically characterized along a z axis perpendicular to the x-y plane). Alternatively, such cameras can generate a point cloud representation of an imaged object. A point cloud is a collection of 3D points in space where each point i can be represented as $(X_i, Y_i, Z_i)$. A point cloud can represent a complete 3D object including the object's back and sides, top and bottom. 3D points $(X_i, Y_i, Z_i)$ represent locations in space where the object is visible to the camera. In this representation, empty space is represented by the absence of points.

By way of comparison, a 3D range image representation $Z(x, y)$ is analogous to a 2D image representation $I(x, y)$ where the depth or height Z replaces what would be the brightness/intensity I at a location x, y in an image. A range image exclusively represents the front face of an object that is directly facing a camera, because only a single depth is associated with any point location x, y. A range image is a dense representation, but has the capability of representing that an (x,y) location is not observed by the camera. It is possible to convert a range image to a 3D point cloud in a manner clear to those of skill.

In aligning a target image, either acquired or generated by a synthetic (e.g. CAD) process, to a model image (also either acquired or synthetic) one approach involves the matching/comparison of a 3D point cloud in the target to one in the model in an effort to find the best matching pose. The comparison can include use of one or more 3D alignment algorithm(s) that involve a metric for scoring of the coverage of the target with respect to the model. For any 3D alignment algorithm, there are instances where the trained model consists of a larger (or more complete) view of the part than what is viewed at runtime—e.g. a portion of the runtime object image can be outside the field of view or otherwise cut off due to—for example, self-occlusion. Likewise, there are instances in which the runtime scene contains more information than the model. For example, if both the model and the runtime scene were acquired (from a respective object) using a single camera, but the object is presented in different orientations in each version, then the runtime scene may contain regions of the part that are absent from the model, and vice versa. If the alignment scoring metric does not account for these scenarios, then it may calculate a lower score than the match actually warrants and the candidate pose may be rejected. More generally, this concern exists in any application where a stage of the solution is to align to an object with significant self-occlusion, or where multiple images are fused at training time to obtain a full 360 degree view of the object, but only one acquired image of the object is used at runtime to perform alignment. In addition, some of either the runtime or training time object image(s) can be outside of the union of the working section (field of view) of the image sensor. These conditions can affect the application of the 3D alignment algorithm and its results in a variety of ways.

A further concern with 3D vision system processes is that, when a 3D image sensor acquires a measurement of an object, it typically measures only the portion of the object that is facing the sensor, and thus, the sensor only acquires the portion of the object that is within the sensor's measurement region. Sometimes the image 3D data includes spurious, or incorrect, measurements (possibly due to inter-reflections). This incorrect or spurious data can affect the efficiency and accuracy of the measurement process.

SUMMARY OF THE INVENTION

This invention overcomes disadvantages of prior art by providing a system and method for increasing the performance (finding the correct alignment result(s)) of 3D alignment on objects during runtime, where those objects are partially occluded in the acquired runtime image in the form of a 3D point cloud. The 3D point cloud information produced by the camera assembly (i.e. one or more 3D camera(s)) includes the location of the camera optical center (acquired from the factory calibration), so that a line segment connecting a query point and the camera assembly is known. A query point can, thus, be classified as: (1) totally visible, wherein the point is inside the union of the working section(s) of the camera(s) in the camera assembly, and there is no other point in the scene blocking the acquisition system from observing this point; (2) occluded, wherein the point is inside the union of the working sections of the camera assembly, but another point in the scene is blocking the acquisition system from observing this point; and (3) outside the working section, wherein the point is outside the union of the working section of the particular cameras, so the acquisition system could not observe this point, irrespective of the rest of the scene. Scoring on a 3D point cloud to determine a match can be performed by only considering the totally visible points, or only considering the totally visible points and points outside the working section of the associated camera. This choice can be made by the user, depending on the application. The identification of occluded working points or totally visible working points allows the system to modify the coverage score of a 3D alignment algorithm based on a visibility check/adjustment, where certain points are excluded from the scoring algorithm.

In an illustrative embodiment, a system and method in a vision system for estimating a degree of match of a 3D alignment pose of a runtime 3D point cloud with respect to a trained model 3D point cloud is provided. The system and method includes scoring, with a vision system processor, a match of a candidate pose of the runtime 3D point cloud relative to the trained model 3D point cloud, including providing a visibility check. The visibility check comprises (a) receiving an optical center of a 3D camera; (b) receiving the trained model 3D point cloud; (c) receiving the runtime 3D point cloud; and (d) constructing a plurality of line segments from the optical center to a plurality of 3D points on the trained model 3D point cloud or the runtime 3D point cloud at the runtime candidate pose. The system and method thereby determines, based upon a location of the 3D points along respective line segments, whether to exclude or include the 3D points in the scoring. Illustratively, the scoring can include at least one of (a) computing a coverage score defining a sum of included 3D points (for example, using either a point-to-plane/surface, point-to-line, or point-to-point metric) and (b) computing a clutter score defining a sum of excluded runtime 3D points scoring includes operating the visibility check incrementally. The visibility check can be performed by testing if the 3D points are visible based upon an adjacency test. Alternatively, the visibility check can be performed by testing if the 3D points are visible based upon a point-against-surface-mesh test. Illustratively, the testing can be performed with SIMD machine-accelerated hardware (i.e. hidden-line removal graphics). The visibility check can be performed based upon a range image. The 3D camera can be part of a 3D camera assembly having a plurality of 3D cameras interconnected to the vision system processor. The runtime 3D point cloud can be acquired from an object imaged by at least two of the 3D cameras in which a portion of the object is imaged within the working section of each of the at least two 3D cameras. The runtime 3D point cloud can also be acquired from an object that is self-occluded within the working section of the 3D camera.

In another embodiment, a system and method that allows for combining measurements of multiple views of an object while also pruning spurious, or incorrect, data is provided. The system and method combines 3D data (3D points) from multiple point clouds (from multiple 3D acquisitions) and identifies spurious 3D data in order to prune such data. In operation, the system and method assumes that the sensor acquires the 3D measurements of the scene at specific relative poses. Such relative poses can be supplied by the user (if the part or sensor has been positioned in known poses—for example by a robot where the hand/eye calibration between the robot and the sensor is known), or inferred (based on registering subsets of features in the various 3D measurements). All of the views are analyzed, including all of the 3D measurements occurring in each view. The system and method operates based upon an expected visibility heuristic which determines whether a 3D point should be visible to a 3D sensor. The expected visibility heuristic is based on the sensor's measurement region (specified as working section of the overall field of view (FOV)), as well as the local surface normal (described generally above) associated with each 3D point.

In an illustrative embodiment a system and method for removing spurious points from a 3D image of an object is provided, which has a plurality of 3D cameras arranged to acquire images of an object within a working section thereof, from a plurality of respective points of view. A visibility process (a) receives a measured 3D point cloud from a 3D camera in the plurality of 3D cameras, (b) generates presumed poses for the object relative to the measured 3D point cloud, and (c) uses information relative to location and orientation of the 3D camera with respect to the object to determine visibility of points of the 3D point cloud. A composite point cloud generation process combines the 3D point cloud from the plurality of 3D cameras into a composite 3D point cloud free of spurious points by omitting points that are not corroborated by appearing in a predetermined number of point clouds—in which such points are expected to be visible, based on the visibility process. The visibility process can be based on a respective measured position of the 3D camera and a respective local surface normal for points in the measured 3D point cloud with respect to the 3D camera. Illustratively, the local surface normal is generated based upon nearby points to the point containing the surface normal. The predetermined number of point clouds can also be defined by an automatic or user-defined threshold.

BRIEF DESCRIPTION OF THE DRAWINGS

The invention description below refers to the accompanying drawings, of which.

DETAILED DESCRIPTION

I. System Overview

Figure 1:
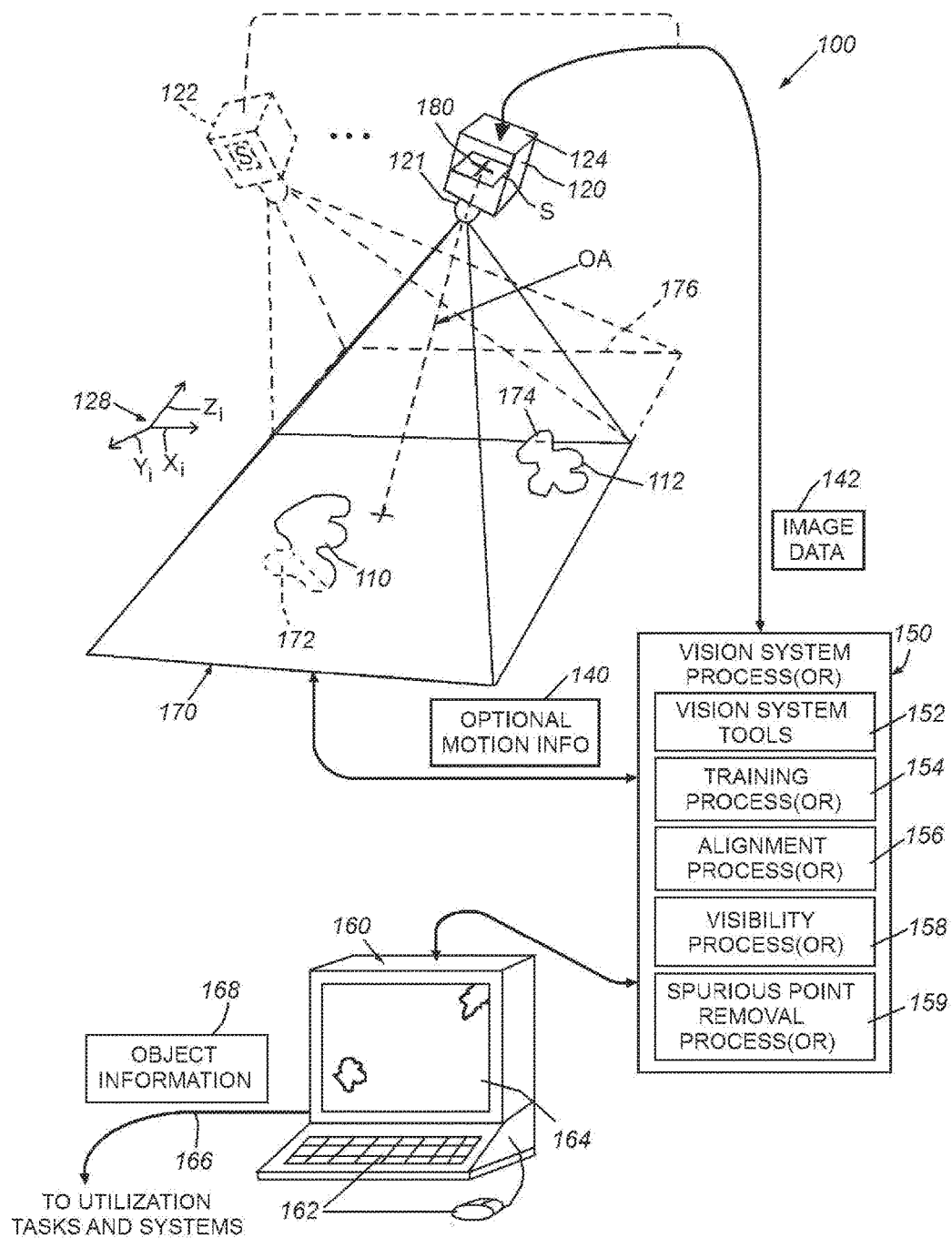
FIG. 1 is a diagram of a vision system including one or more 3D camera assemblies, acquiring an image of one or more objects during training or runtime in which at least one of the exemplary objects is partially outside the field of view of at least one camera, or otherwise obscured/occluded, and the other of the exemplary objects is defective—or the one or more objects otherwise generate spurious points in one or more 3D camera assemblies.

FIG. 1 shows a machine vision system arrangement (also termed herein, a "vision system") 100 for use in inspecting and/or analyzing features of one or more objects 110, 112 that is imaged within the working space or field of view (FOV) of one or more 3D vision system camera assembly with discrete 3D cameras 120, 122. Note that while this description subsequently refers exclusively to the exemplary camera 120. However the overall camera assembly can include a plurality of additional cameras (e.g. camera assembly 122, shown in phantom). These cameras can be interconnected with the overall vision system process(or) (150, described further below). Each 3D camera (120, 122) can be any acceptable arrangement of components, and typically includes a respective lens assembly 121 and a camera body 124 that houses an image sensor (or "imager") S, based upon any acceptable imaging technology, such as CCD or CMOS. The imager S can be arranged to acquire images in one or two dimensions (e.g. along the respective xi, yi axes of the camera's coordinate system 128) in an array of image pixels that can be adapted to sense the scene in either grayscale or color. The camera assembly 120 is further adapted to determine a third orthogonal dimension (e.g. height along the respective zi axis) that constitutes a 3D "range image" of the surface of each object 110 and 112. A variety of technologies can be employed to generate height data for respective image pixels. Alternatively, the 3D vision system camera assembly can directly acquire the collection of 3D points (point cloud) using appropriate camera functionalities and settings. Note that, in addition to the depicted example in FIG. 1, showing one or two cameras, a larger number (e.g. three or more) of cameras, can be employed in an overall 3D camera assembly arrangement and the term "3D camera assembly" can be used alternatively herein to describe the overall arrangement of one or more discrete 3D cameras for generating a 3D point cloud or range image representation of the object surface.

While not shown, one exemplary type of 3D camera assembly employed to generate a 3D range image or point cloud is a laser displacement sensor, which projects a fan of laser light at the object surface to form a line (e.g. oriented across the x-axis direction), and receives reflected light at the laser displacement sensor's imager S from the projected line at a relative (acute) angle between the plane of the illumination fan and respective imager's optical axis OA. As described, other modalities can be used to generate range or height information, including, for example, LIDAR, structured light systems, time-of-flight sensor, stereo vision systems (e.g. a pair of spaced cameras 120 and 122), DLP metrology, etc. These systems all generate an image that provides a height value (e.g. z-coordinate) to pixels.

In a typical arrangement, the 3D camera 120 and/or object 110 can be in relative motion (e.g. in the physical y axis coordinate direction of one or more cameras) so that the object surface is scanned by the laser displacement sensor(s), and a sequence of images are acquired of the laser line at desired spatial intervals—typically in association with a motion controller and associated encoder or other motion-measurement device (or, alternatively, at time based intervals) that delivers motion information 140 to the system vision processor (150, described below). In that respect, the position of a point on the object along the motion direction is defined as coordinate Yi. The collection of points (Xi,Yi, Zi) acquired by the 3D camera assembly is defined as the point cloud. In other arrangements, such as with a time-of-flight sensor 3D camera, no relative motion is necessary.

The camera body 124 can contain various image processing components that constitute a vision system processor 150 that operates an associated vision process. The vision processor 150 operates upon image data 142 based upon the acquired images of the scene and/or other sources (e.g. a CAD representation of a model), and can employ vision system tools and processes 152 to extract information from the acquired image. This information can relate to features of interest and other items appearing within the image—for example vision system tools such as the well-known PatMax®, available from Cognex Corporation of Natick, Mass., can be used to analyze 2D and 3D features in the image and provide information on relative pose, alignment and other details—e.g. edges, blobs, etc. While some or all of the vision system processes can be instantiated within the body 124 of the camera assembly 120, it is expressly contemplated that some or all of the processes can be carried out by an interconnected (wired or wireless) computing device/processor 160, such as a purpose-built processor or a general purpose computer (e.g. server, PC, laptop, smartphone, tablet, etc.), with appropriate user interface (mouse/keyboard) 162 and/or display 164 (e.g. a touch screen). The interconnected computing device/processor 160 can employ the processed image information about the object/alignment 168 to carry out further utilization processes or tasks via a communication link 166 or other interface arrangement. For example, where the vision system carries out inspection tasks, the information can be used to provide quality control information to a database or to reject defective parts on a production line.

A training process(or) or module 154 handles the training and storage of one or more 3D models/representations composed of 3D range image or point cloud data that defines features that facilitate alignment of the model with found features from a runtime 3D range image or point cloud image of a runtime (target) object. The trained model(s) can encompass features found in an overall view of an object, different parts or orientations of a particular object, and/or multiple objects.

In the illustrative embodiment, the vision process and processor 150 includes an alignment process(or) or module 156 that employs an appropriate alignment algorithm (or process) the attempt to align the features of the model and those of the runtime (target) 3D image. The alignment process(or) 156 and training process(or) 154 each interoperate with a 3D alignment visibility process(or) or module 158, which performs a visibility check to self-occluded poses of the runtime 3D point cloud. This allows modification of the coverage and/or clutter score upon which 3D alignment is based.

The processor 150 further includes a spurious point removal process(or) 159, which is described further below, but functions generally to ensure that an overall 3D point cloud of the object (e.g. object 110) acquired from multiple viewpoints by respective 3D camera assemblies (e.g. cameras 120, 122) is free of spurious points (noise) that are not part of the actual object.

II. Alignment of Partially Occluded Objects

Figure 2:
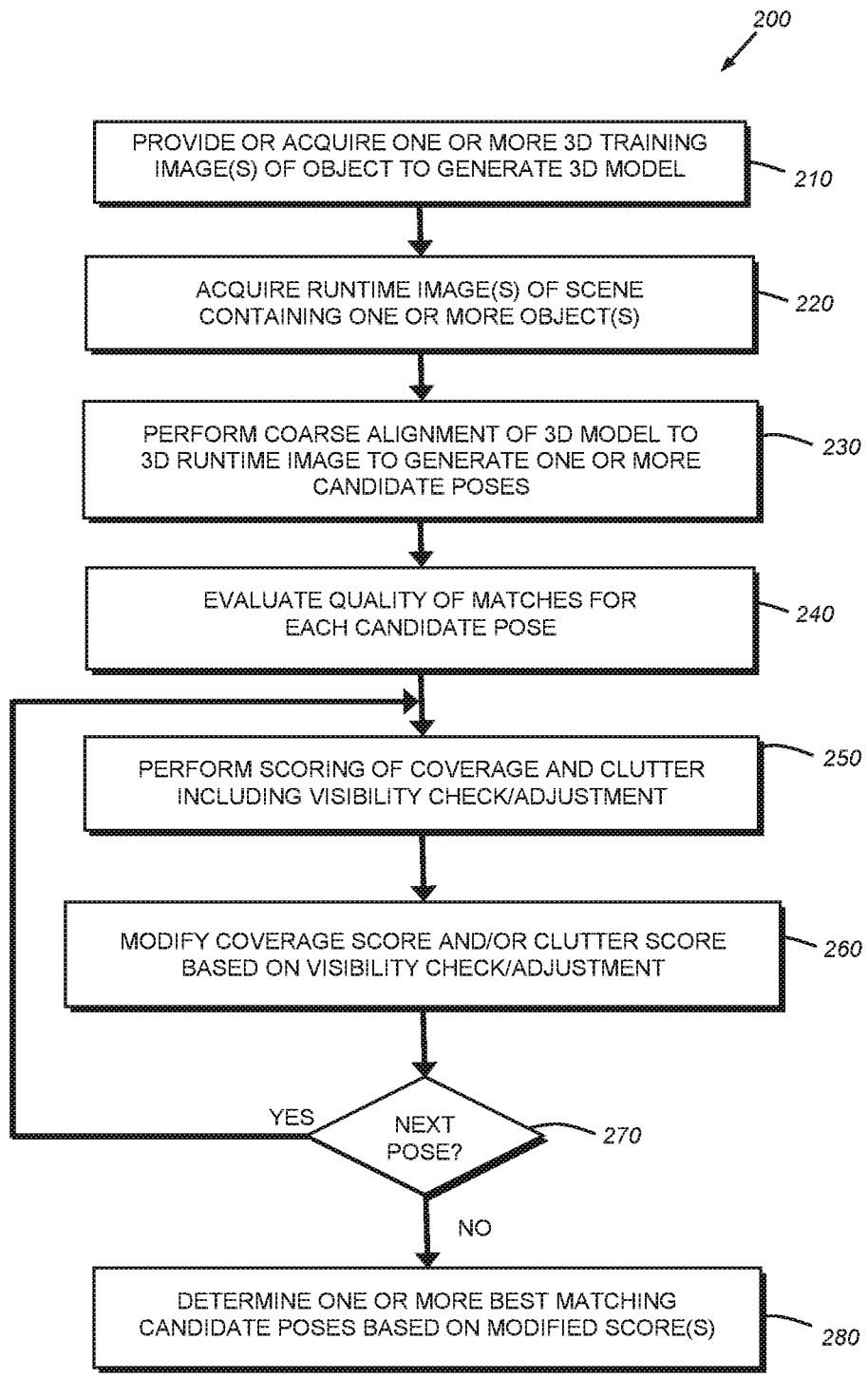
FIG. 2 is a flow diagram of an exemplary, overall procedure for aligning 3D point clouds of a trained model and a runtime object, including a visibility check/adjustment process to address partial occlusion of the runtime object 3D point cloud, according to an illustrative embodiment.

With reference to the procedure 200 of FIG. 2, the system, in step 210, provides one or more 3D training images, typically defined as one or more respective 3D point cloud(s). The procedure 200 is directed toward the location of a trained model pattern in a runtime scene. During the operation of the system and associated procedure 200, a plurality of candidate poses are generated. Each candidate is a possible location of the trained model pattern in the scene. The goal is to assign a numeric score or value (that is normalized, by way of non-limiting example) from 0.0 to 1.0 to each of the candidates, where 0.0 is the worst match possible and 1.0 is the best match possible.

Figure 4:
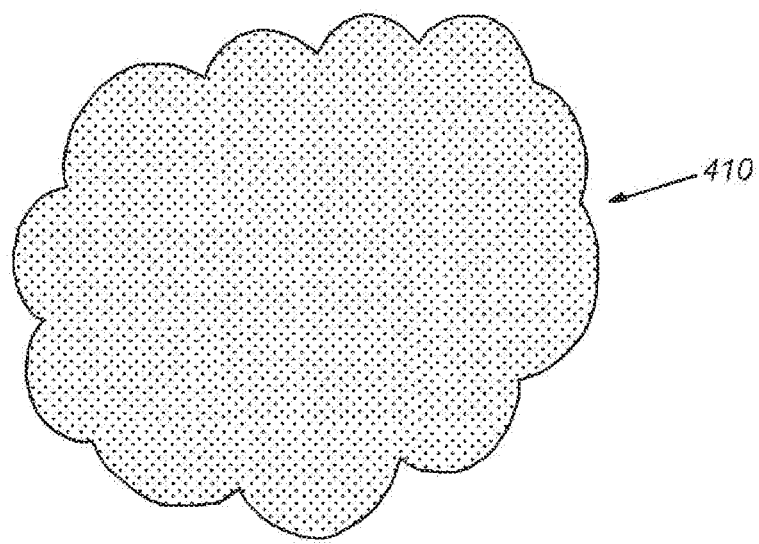
FIG. 4 is a diagram showing an exemplary 3D point cloud containing a full model of an object to be aligned according to the procedure of FIG. 2 provided during training time.

The training model images can be acquired from an actual object or can be defined as a synthetic image—e.g. a CAD representation of the object from one or more points of view. In general, the trained model pattern is a form of 3D data structure (e.g. a point cloud), which the user is trying to find, along with a set of auxiliary data structures used during the execution of a 3D alignment procedure by the system. In this example, the trained model pattern defines a full view of the object, either from CAD or an acquisition system that incorporates multiple views. This exemplary model 410 is shown in FIG. 4.

In step 220, the procedure 200 acquires one or more runtime 3D point clouds containing image data of one or more runtime object(s). As shown in FIG. 1, the exemplary objects 110 and 112 each represent instances in which the camera assembly 120 images an incomplete image that could potentially affect the alignment procedure. More particularly, object 110 is entirely within the working section 170 (defined generally as a pyramid tapering upwardly toward the camera optics 121 of the camera, but includes an actual defect 172 (shown in phantom) in the form of a missing portion 174 of the runtime object. In an inspection environment, such an object would be rejected. Conversely, the object 112, which is complete and defect-free, is imaged so that it is partially outside the working section of the camera 120, or otherwise occluded (with a portion 174 outside the bounds of the working section 170). Note that the portion 174 is within the working section 176 of camera 122 (shown in phantom).

Figure 5:
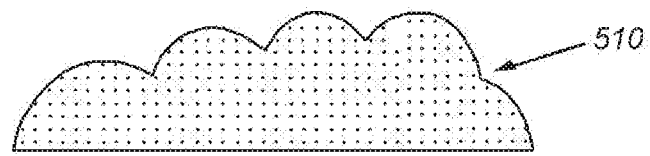
FIG. 5 is a diagram of an exemplary 3D point cloud of an object provided during runtime including a partial occlusion of the pattern with respect to the trained model.

More particularly, with reference to FIG. 5, an example of the runtime scene is shown. This image includes another 3D data structure that contains zero or more instances of the object 510 similar to the trained pattern at different poses. Each instance can be translated and rotated relative to the trained pattern. In this example, the runtime scene is a single (i.e. partial) view of the object.

The camera assembly includes various calibration parameters/information that are stored as part of its setup. The alignment algorithm has access to relevant information about the sensing setup (e.g. calibration information). This is used in the follow-on steps of the procedure 200.

In procedure step 230, the procedure 200 attempts to perform coarse alignment of the runtime point cloud with respect to trained point cloud(s) so as to locate any potential candidate poses. This coarse alignment is used to allow for refined alignment based on further evaluation candidate poses as described below.

The procedure 200 evaluates the quality of match for each candidate pose versus the model point cloud (step 240). This procedure step evaluates how good a candidate is. In addition to the inputs of the training model, runtime image and calibration information, the procedure receives a candidate pose that maps the pattern onto a portion of the runtime scene. The procedure assumes that this portion of the scene contains an instance of the pattern, and the score is a measure of how strongly the procedure adheres to that assumption. FIG. 5 represents a possible candidate 600 that includes the runtime image 510 in combination with the missing portion 610 from the model pattern 410. This presents the complete pattern of the model and thus represents the best possible match. As such, this candidate pose should receive a high score.

With reference to step 250 of the procedure 200, the score is generated by calculating the underlying coverage and clutter scores got the candidate pose, and then combining the two scores into a total score for the pose. The coverage score is the proportion of the pattern that is visible in the runtime scene. The clutter score is a measure of how much "extra" noise is present in the scene adjacent to the pattern instance that is under analysis by the system looking at. In an embodiment, the final score can be represented by:

$$Score=coverage-0.5*clutter.$$

Computation of clutter score is discussed by way of useful background information in commonly assigned U.S. patent application Ser. No. 14/938,981, entitled SYSTEM AND METHOD FOR SCORING CLUTTER FOR USE IN 3D POINT CLOUD MATCHING IN A VISION SYSTEM, filed Nov. 11, 2015, by Hongjun Jia, et al., the teachings of which are incorporated herein by reference. However, since only a portion of the runtime object 510 is available in the candidate 600, a large portion (610) of the model pattern (410) is unmatched to the runtime image. In a conventional scoring algorithm all the unmatched portions 610 are not counted in the naïve definition of the coverage score. Otherwise, the depicted match is essentially perfect so it would be desirable to avoid penalizing this candidate due simply to occlusion of a portion of the runtime image.

Figure 3:
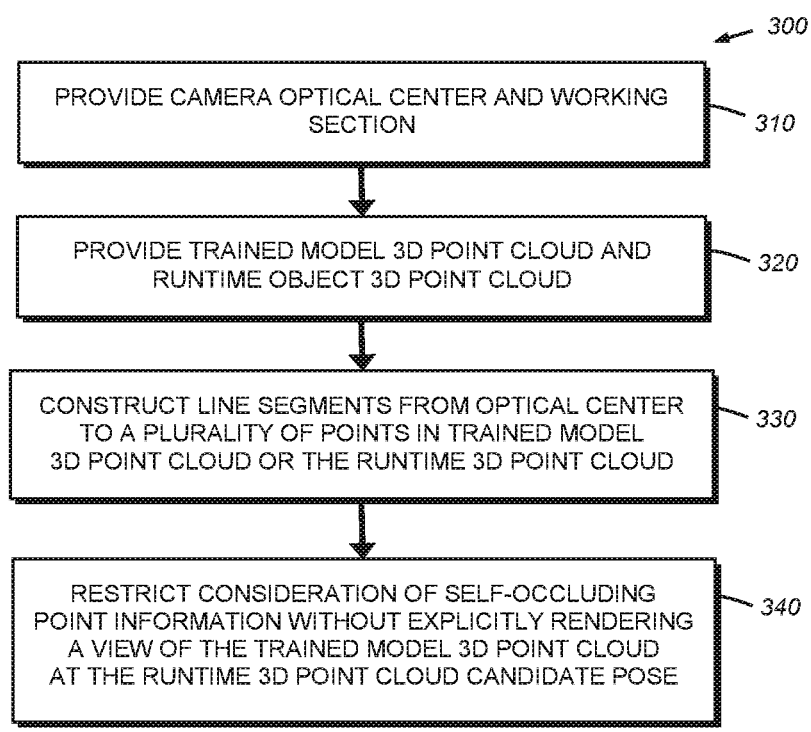
FIG. 3 is a flow diagram of the visibility check/adjustment process according to the procedure of FIG. 2.
Figure 6:
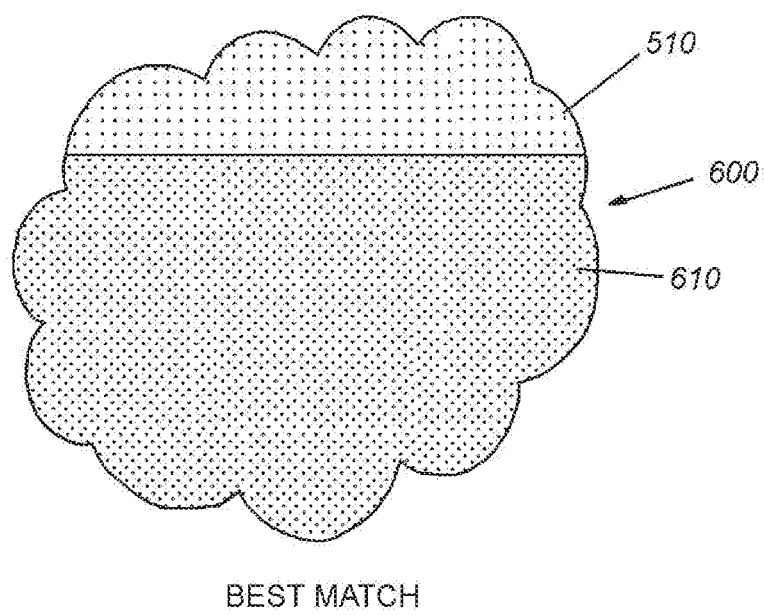
FIG. 6 is a diagram showing an aligned overlap of the runtime 3D point cloud and the model 3D point cloud to define a best match in which a portion of the model 3D point cloud is missing (due to occlusion relative to the runtime portion, etc.)
Figure 8:
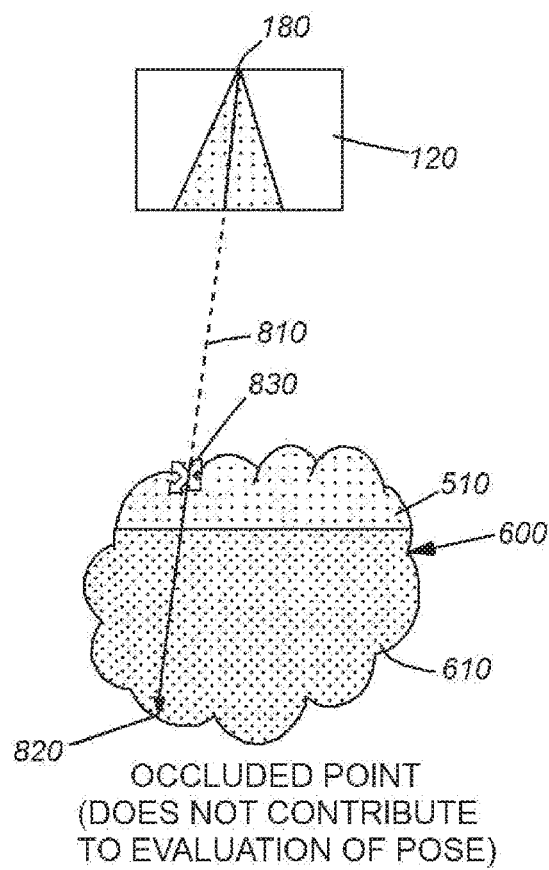
FIG. 8 is a diagram representing the visibility check/adjustment process of FIG. 3, in which query point on the model 3D point cloud is identified as occluded and excluded from the coverage score.
Figure 9:
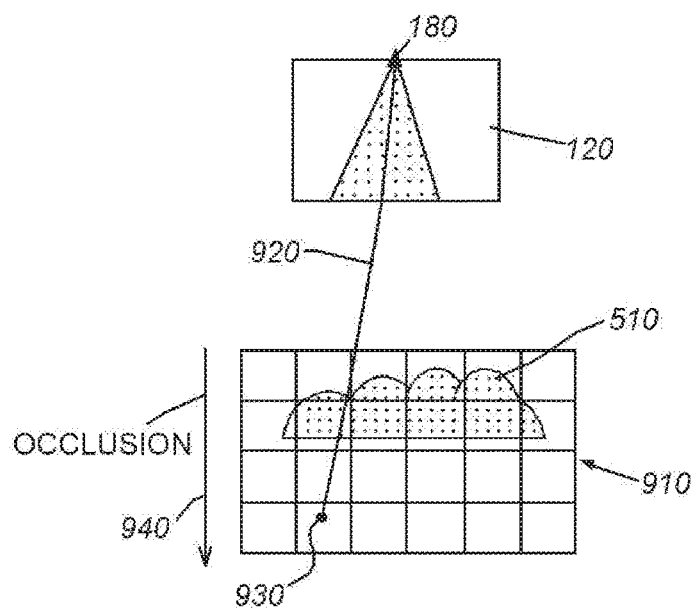
FIG. 9 is a diagram representing a technique for classifying query points as occluded or totally visible using a voxel grid approach in accordance with the exemplary visibility check/adjustment process of FIG. 3.

To attempt to address the scenario depicted in FIG. 6, the procedure 200 performs a visibility check/adjustment during the coverage evaluation (step 250) to determine if a given point in the runtime image 510 should contribute to the overall coverage (step 260 of procedure 200). The general process 300 for performing a visibility check/adjustment is described in FIG. 3. As part of the process, in step 310 the calibration information provided includes the camera's optical center and working section (see representation of working section 170 and optical center 180 in FIG. 1). These parameters are inherent in the available camera information (i.e. provided by factory calibration), and thus the process makes use of them (along with the trained model and runtime image 3D point buds—step 320) in determining the visibility check/adjustment according to illustrative embodiments. Given these inputs, in step 330 the process 300 constructs line segments from the optical center 180 to each of a plurality of points in the trained model 3D point cloud or the runtime 3D point cloud. In step 340, the process 300 restricts/excludes consideration of point information without (free of) an explicit rendering of a view of the trained model 3D point cloud at the runtime candidate pose. An operational example of this visibility check/adjustment process is shown in FIGS. 7-9.

Figure 7:
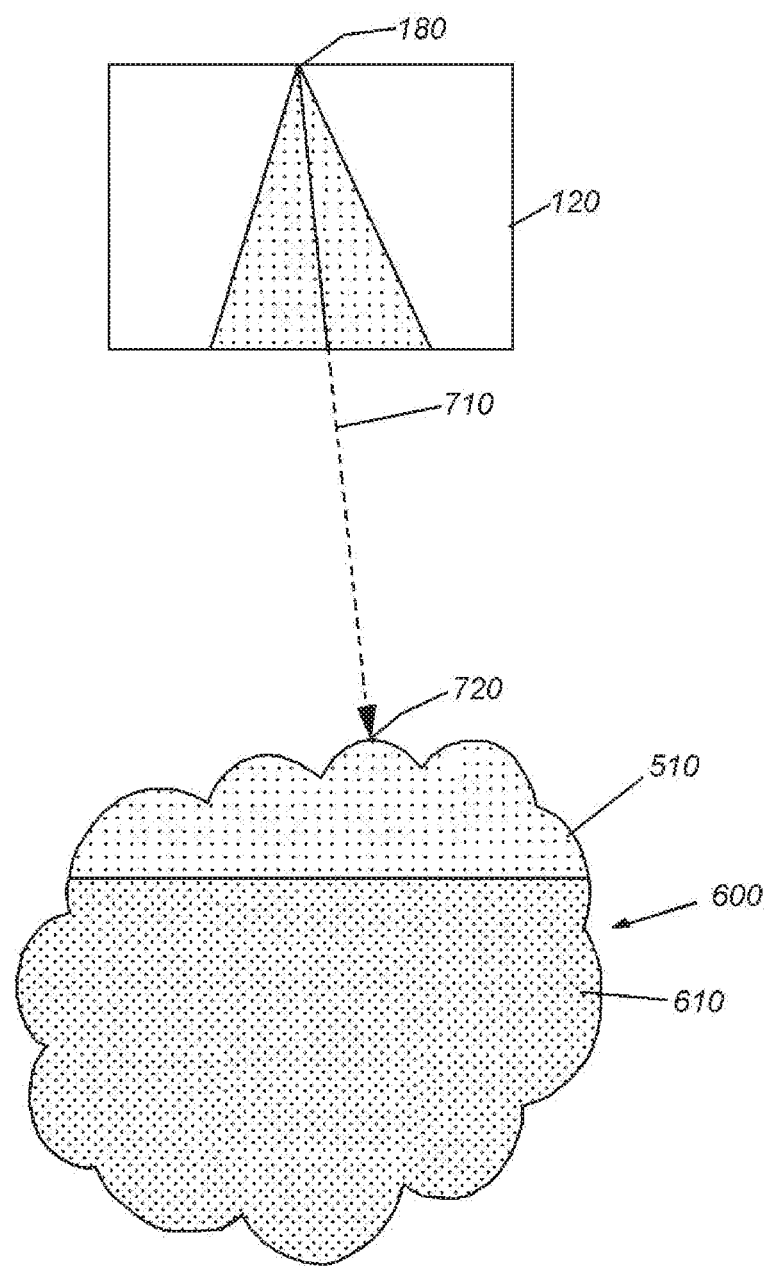
FIG. 7 is a diagram representing the visibility check/adjustment process of FIG. 3, in which a query point on the runtime 3D point cloud is identified as totally visible, and included in the coverage score.

In FIG. 7 the candidate pose 600 is shown with line segment 710 drawn from the optical center 180 (which is known from the calibration information) of the camera 120 to a point 720 on the point cloud of the runtime image portion 510, which should contribute to the coverage score. Conversely, FIG. 8 depicts a line segment 810 to a point on the occluded portion 610 of the candidate 600 that is excluded from any contribution to the coverage score in either the numerator or denominator of that mathematical relationship. This exclusion results from the presence of an intervening occlusion point 830 on the runtime portion 510 along the line segment in closer proximity to the camera 120 than the occluded point 820.

By way of non-limiting example, a summary of a routine for calculating coverage score is provided as follows:

Num Points Considered=0;
Num Points Covered=0;
For each point in the pattern:
  Map the point through the candidate pose.
  If the mapped point is unoccluded: [VISIBLITY CHECK]
    Num Points Considered=Num Points Considered+1;
    If the mapped point is close to a point in the runtime scene:
      Num Points Covered=Num Points Covered+1
Coverage score=Num Points Covered/Num Points Considered; where VISIBILITY CHECK refers to performance of the above-described process (300 and FIGS. 7-8).

Note that the contribution of clutter to the overall candidate score can be modified in a manner similar to that of the coverage score modification, so as to avoid the inverse problem (i.e. the runtime scene contains portions that were occluded in the pattern). In such instances, the line segment from the optical center is drawn to identify and exclude points on the candidate pose that would normally be excluded in the presence of a complete runtime image of the object.

In brief summary, the steps for evaluating a visibility check/adjustment include use of (a) camera configuration information; (b) a query point, which comprises the "mapped point" from the above-described routine; and (c) runtime scene, in which the runtime scene can be held in a voxel grid. This can be defined by a series of voxels, each of which can contain a predetermined number of points. This voxel grid 910 can be represented in accordance with FIG. 9. Each point in a voxel occludes all points in voxels below along the direction of occlusion 940, since in this depicted configuration, the camera 120 is located in the upwards direction. The routine thus, checks every column of voxels in the grid 910 that contains any part of the line segment 920 connecting a query point 930 and the camera 120. If the upper-most point in this column is higher than any point of the line, then the line intersects the runtime scene, so the query point is occluded. Otherwise, the query point is not occluded. Thus, in the depicted example of FIG. 9, the points on the column of voxels (passing through the runtime portion 510) along the line segment 920 occlude the query point 930. The routine therefore indicates that query point 930 is occluded.

By way of definition, a query point can be classified as: (1) totally visible, wherein the point is inside the union of the working section(s) of the camera(s) in the camera assembly, and there is no other point in the scene blocking the acquisition system from observing this point; (2) occluded, wherein the point is inside the union of the working sections of the camera assembly, but another point in the scene is blocking the acquisition system from observing this point; and (3) outside the working section, wherein the point is outside the union of the working section of the particular cameras, so the acquisition system could not observe this point, irrespective of the rest of the scene.

Referring again to the overall procedure 200 of FIG. 2, the coverage score of each candidate pose is evaluated and modified in accordance with steps 250 and 260 until (via decision step 270) all candidate poses have been scored. Then (via decision step 270), the scores are compared and the candidate's with the best scores and/or those scores above a predetermined threshold are returned as alignment results in step 280. Note that the procedure 200 can be employed for each camera and associated working section in the overall camera assembly and the alignment results can be combined as appropriate. Illustratively the camera assemblies can all be calibrated to a single global coordinate system using (e.g. hand-eye calibration techniques) or each camera can operate with its local coordinate system.

The visibility check/adjustment process can be further modified to improve accuracy and/or performance. For example, the above-described visibility process engages in batch approach, in which each point is considered before determining a final coverage (and/or clutter) score. Alternatively, an incremental approach can be employed in which the procedure (a) evaluates a portion of the trained model pattern for a large number of candidate poses; (b) selects a subset of these poses for further processing; and then (c) considers a different portion of the pattern. Steps (a)-(c) are repeated until the procedure has evaluated the entire trained model pattern or has reduced the number of possible candidate poses to only one possible candidate pose. As used herein, the term "incremental" or "incrementally" refers to a general procedure as set forth above. In various embodiments, hidden line removal hardware can also be used to determine occlusions (e.g.) single-instruction multiple-data (SIMD) machine-accelerated hardware.

Note that the above-described procedure and modifications thereof typically contemplates the use of programming languages that run on computer CPUs, rather than graphics card GPUs (e.g. SIMD machines). Where the process is run on a GPU, it is contemplated that a large number of points can be mapped concurrently, and visibility checks/adjustment can be performed in parallel in a GPU language—for example employing a DirectX shader language (HLSL), or the OpenGL shader language (GLSL).

III. Removal of Spurious Points and/or Noise from 3D Point Clouds

Figure 10:
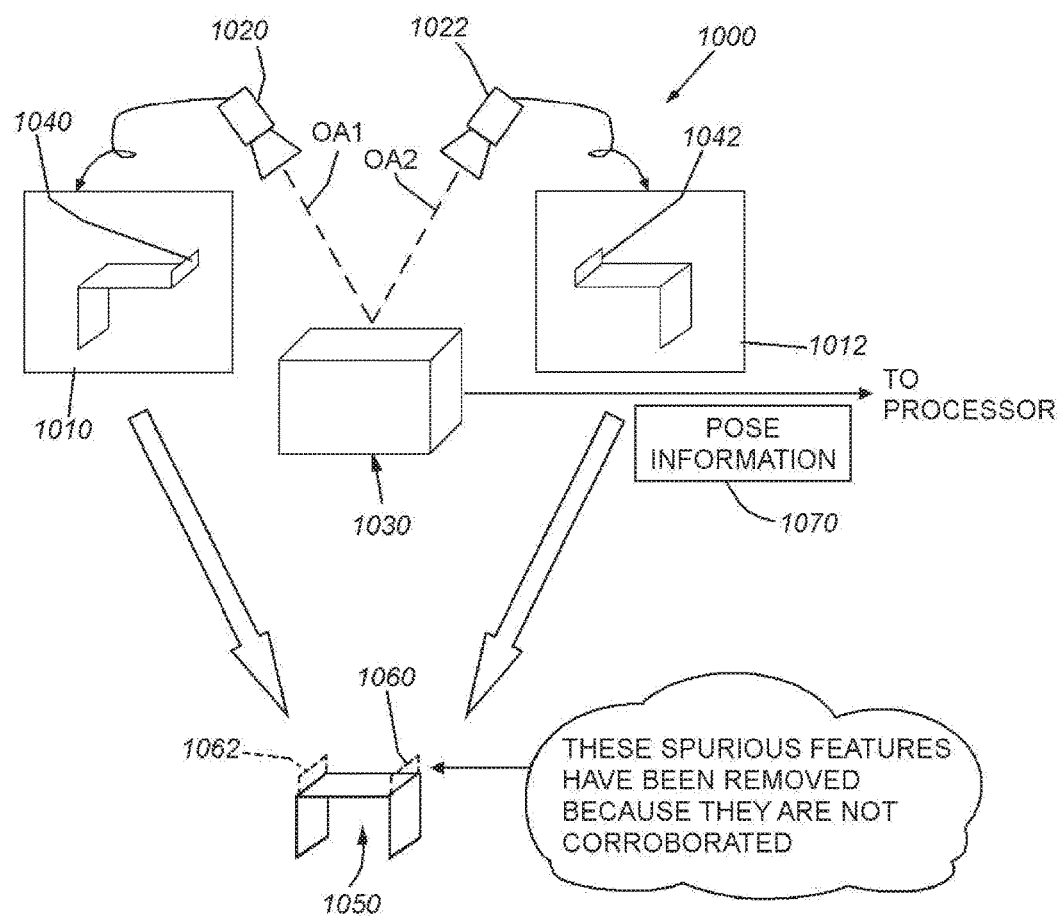
FIG. 10 is a diagram of a vision system arrangement with one or more camera assemblies in which spurious points appear in the acquired 3D image(s) of one or more of the 3D camera assemblies acquiring images on a scene.

With reference again to the processor 150 of FIG. 1, a spurious point removal process(or) 159 is provided, in addition to the other above-described processes/ors and/or modules 152, 154, 156 and 158. Referring also to the exemplary arrangement 1000 of FIG. 10, the illustrative embodiment removes spurious points in a 3D point cloud generated by the combination of acquired image data 1010 and 1012 from a plurality of respective cameras 1020 and 1022, oriented at predetermined points of view (OA1 and OA2) with respect to an exemplary object 1030. As shown, the exemplary object 1030 defines a rectilinear, six-sided shape with no extraneous features for simplicity. Because of optical effects or other causes (e.g. internal reflections), each acquired 3D point cloud 1010 and 1012 includes additional points/features 1040, 1042 that are merged into the aligned, overall 3D point cloud 1050, generated by the processor 150. As described below, this spurious image data is removed (pruned), as indicated by dashed lines 1060 and 1062 from the final version of the point cloud. While not shown, it is contemplated that a plurality of cameras can be located in a manner to acquire a full 360-degree view of the exemplary object and deliver point cloud data that is combined by the processor into an overall 3D point cloud representation of the imaged object.

Figure 11:
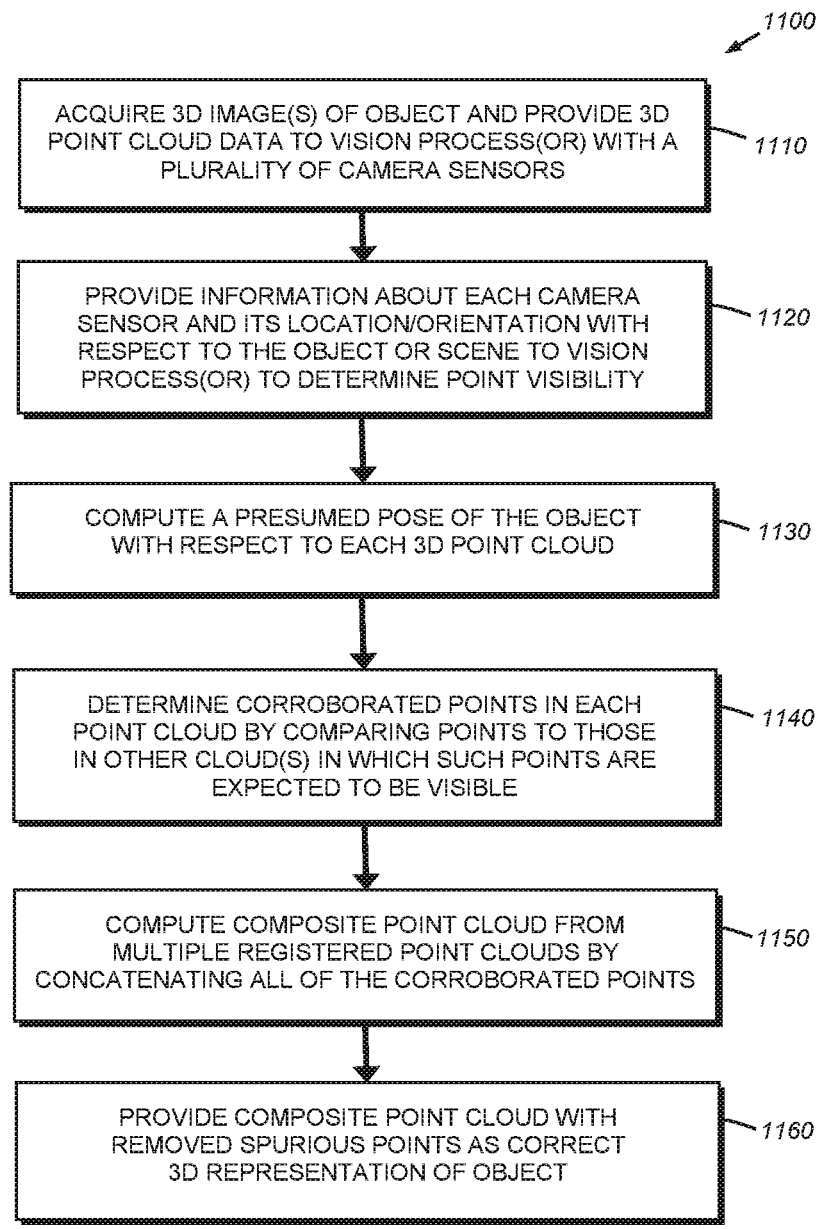
FIG. 11 is a flow diagram of an overall procedure for determining spurious points in 3D point clouds in the arrangement of FIG. 10, and generating a composite point cloud free of such spurious points.

FIG. 11 shows a flow diagram showing an overall procedure 1100 for generating a composite point cloud from a plurality of 3D registered images of an object for use in training or runtime that omits spurious points. In step 1110, the system acquires one or more 3D images of the object from 3D camera sensors at each of a plurality of orientations/points of view and this image data is provided to the system processor(s) and associated vision system process(es) as 3D point cloud data. In step 1120, the system provides information about each cameras' location/orientation. This can be defined as the relative optical axis angle within the global coordinate system as determined during calibration and relative distance from other cameras, and/or a reference point in the coordinate system. Other parameters, such as focal distance, etc. can also be provided. This information is used to assist in determining point visibility as described further below.

In step 1130, the system uses the information from the 3D point clouds and camera locations to compute presumed poses of the object. This pose information (1070 in FIG. 10) is forwarded to the vision system process(or). Thus, in summary, the inputs to the basic procedure herein are a set of data sets consisting of: (a) point cloud, (b) object pose, and (c) sensor information, where each such data set includes: (i) the measured point cloud, (ii) the presumed pose of the object which induced the point cloud, and (iii) information about the sensor for computing the visibility for each point. A visibility criterion can be based on the measured position with respect to the sensor's measurement region and the local surface normal (described above) with respect to the sensor. The local surface normal can then be extrapolated from the point cloud by considering "nearby" (as defined below) points.

Figure 12:
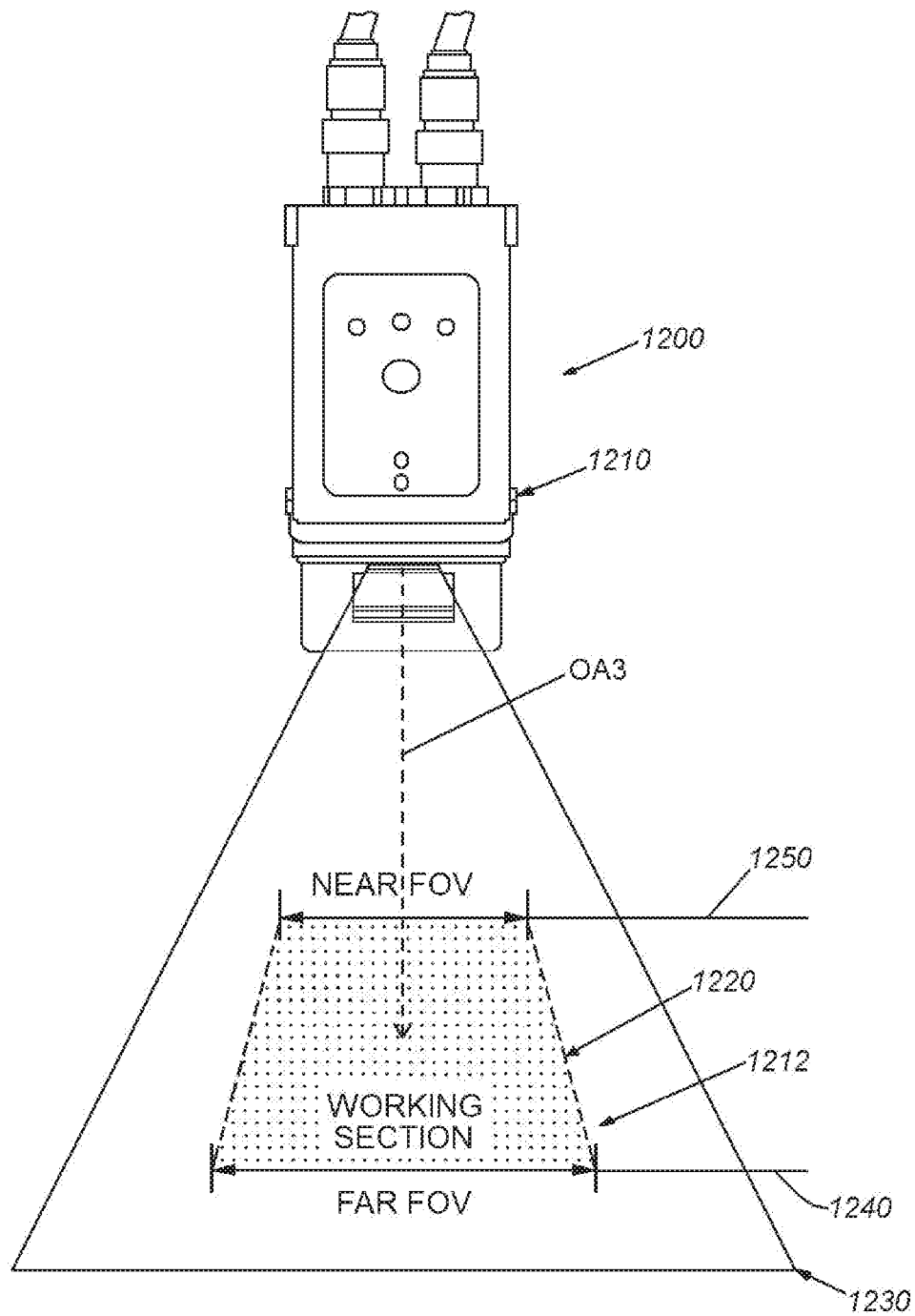
FIG. 12 is a front view of an exemplary 3D camera assembly as employed in the arrangement of FIG. 10, showing an applicable working section in which a 3D point cloud is acquired.

In general, and with reference also to FIG. 12, the exemplary camera/sensor arrangement 1200, shows a 3D camera/sensor 1210 acquiring an image of a scene 1212 in which a smaller working section 1220 is defined within the broader field of view (FOV) 1230 having limits defined in part by a far FOV 1240 and near FOV 1250 as a result of a non-perpendicular optical axis OA3 with respect to a plane of the imaged scene 1212. The procedure 1100 herein assumes that the camera/sensor 1210 acquires 3D measurements of the scene at specific relative poses, and that the relative poses can be supplied by the user (if the part or sensor has been positioned in known poses—such as by a robot where the hand-eye calibration (in a given motion coordinate space) between the robot and the sensor is known, or inferred (based on registering subsets of features in the various 3D measurements). In the illustrative procedure, all of the views are analyzed by the vision system process(or), including all of the 3D measurements occurring in each view. A primary operational principal in the analysis is based on an expected visibility heuristic which determines whether a 3D point on the object should be visible to a particular 3D sensor. The expected visibility heuristic is further based on the sensor's measurement region (i.e. the working section 1220), as well as the local surface normal associated with each 3D point.

Figure 13:
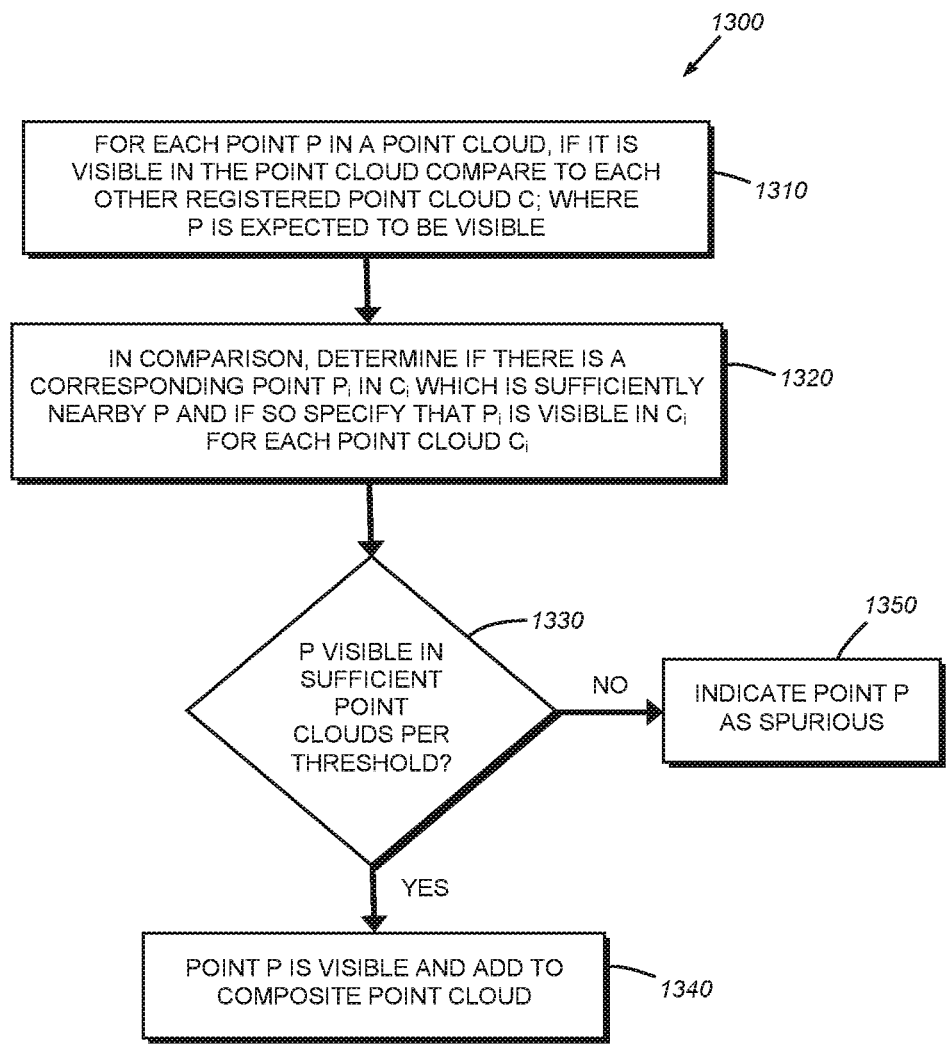
FIG. 13 is a more detailed flow diagram of a procedure for adding points to a composite point cloud generated according to the overall procedure of FIG. 11.

In step 1140, the procedure 1100 determines corroborated points in each point cloud. This involves a comparison of points in each point cloud to such points that are expected to be visible in other point clouds in the overall group of registered point clouds delivered from sensors to the processor. This visibility determination is derived in accordance with the procedure 1310 of FIG. 13, which is represented by the following algorithm:

For each point, p, from a point cloud,
if p is visible in its point cloud (which is not always the case in particular where p is spurious), then compare every other registered (aligned) point cloud Ci where p is expected to be visible (step 1310),
determine if there is a corresponding point pi in Ci which is sufficiently nearby to p and if there is a corresponding point pi in Ci, then specify that Ci is visible (with respect to p) (step 1320).
if the proportion of point clouds Ci where p is visible, i.e. |Visible({Ci})|/|{Ci}|, exceeds a threshold T (decision step 1330), then add p to the composite point cloud (step 1340). Otherwise, point p is marked as spurious and omitted from the composite point cloud (1350).

Note that, (1) surface normals are computed for the source point clouds (if not present) so as to be used for the visibility procedure (1300), (2) the composite point cloud copies a client3DFromPointCloud3D transform of the first source point cloud, and (3) the sensor info (if provided in the original source point clouds) is appropriately included in the composite point cloud (which involves updating originalSensor3DFromGeometry3D transforms to reflect the fact that the client3DFromPointCloud3D transform changes from each source point to the composite point cloud.

This heuristic has two parameters: (1) distance tolerance (between the original point p and the corresponding transformed point pi in the other cloud Ci), and (2) the visibility proportion threshold T, the proportion of all clouds in which an expected visible point must be seen in order to be included in the composite point cloud. The threshold T can be set automatically based on various parameters or characteristics—for example, the number of sensors, the exposure level, etc. Alternatively, the threshold T can be set using a user interface within the vision system software application.

The main procedure 1100 then computes a composite point cloud in step 1150 from multiple registered point-clouds by concatenating all of the corroborated points (in the respective point clouds), such points having been corroborated if they were visible in other point clouds for which they were expected to be visible. The procedure 1100 then provides the composite point cloud in step 1160 with spurious points removed/omitted. This affords a correct 3D representation of the object for use in generating a model or performing various vision system analysis processes, such as alignment, inspection, robot guidance, etc.

Figure 14:
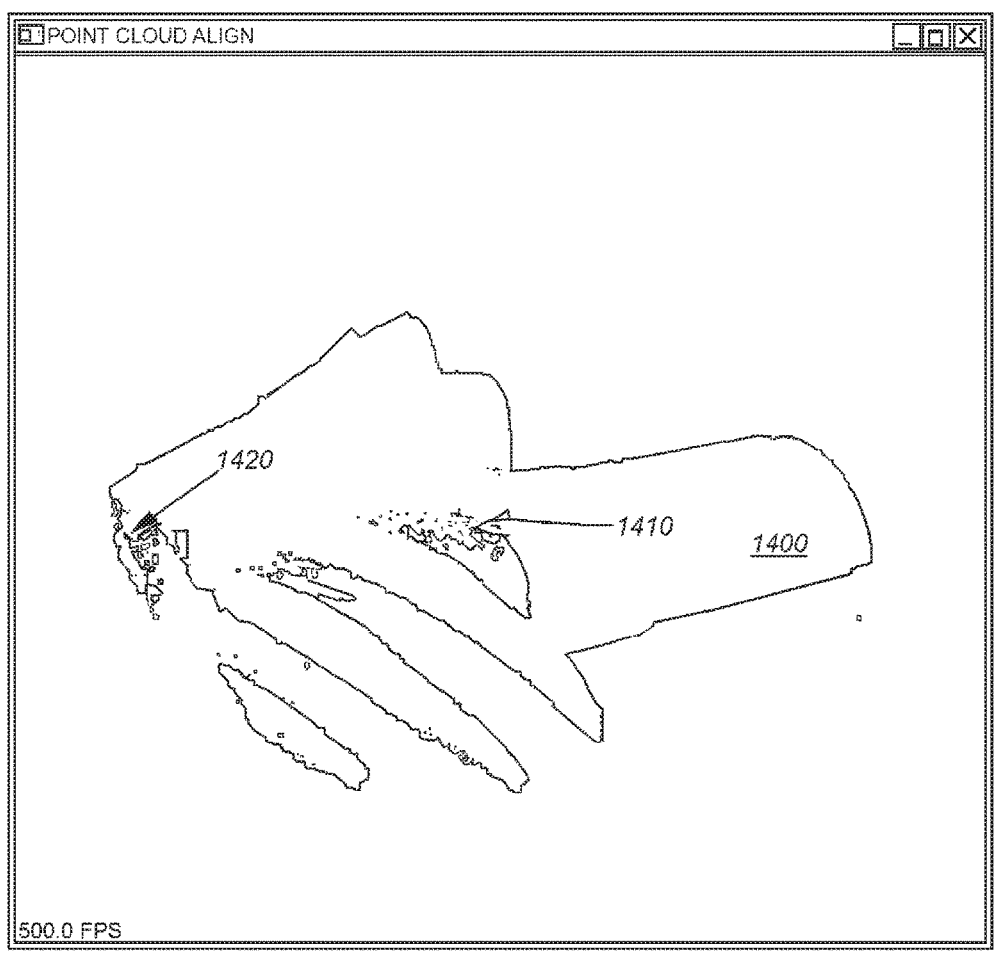
FIG. 14 is a diagram based on a 2D rendering of a 3D point cloud of an object (e.g. a gear) acquired by one or more 3D cameras showing occurrences of spurious points.
Figure 15:
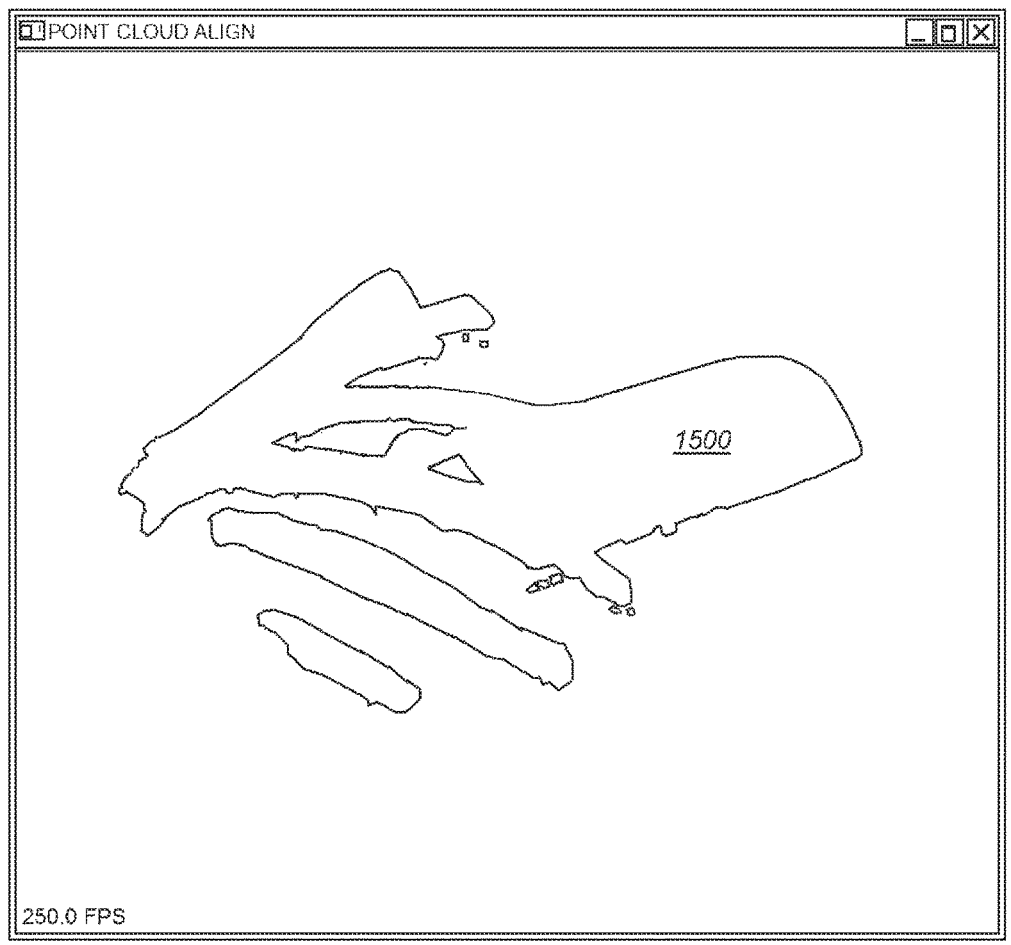
FIG. 15 is a diagram based on a 2D rendering of a 3D point cloud of the object of FIG. 14 after removal of spurious points from the 3D point cloud.

Reference is made to the screen display of FIG. 14, that depicts an image 1400 of an object (e.g. a gear) acquired by a plurality of 3D point-cloud generating sensors. The image 1400 includes noise as a result of spurious points in one or more point clouds. Conversely, by applying the removal procedures in accordance with the exemplary embodiment herein, the resulting image 1500 in FIG. 15 is generated. Note that the edges appear crisper and more defined, with fewer spurious points/noise present.

While not shown, it should be clear that cameras/sensors can be mounted so as to image all 360 degrees of the object. FOVs and/or working sections can overlap to ensure full coverage of the object. Appropriate illumination can also be provided.

It should be clear that the above-described alignment system and method provides an effective technique for aligning model 3D point clouds with runtime 3D point clouds in the presence of self-occlusion. This system and method can be used with a plurality of camera with associated working sections that my or may not include a totally visible view of the runtime object(s). This system and method can be adapted to operate on a variety of processing platforms. Likewise, an effective technique for generating 3D images of objects is also described herein. This technique effectively removes any noise in the form of spurious points by comparing expected visible points in a plurality of point clouds to excise those that do not appear in a sufficient number of such point clouds.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A method in a vision system for estimating a degree of match of a 3D alignment pose of a runtime 3D point cloud with respect to a trained model 3D point cloud comprising the steps of:
   scoring, with a vision system processor, a match of a candidate pose of the runtime 3D point cloud relative to the trained model 3D point cloud, including providing a visibility check that comprises
   (a) receiving an optical center of a 3D camera,
   (b) receiving the trained model 3D point cloud,
   (c) receiving the runtime 3D point cloud, and
   (d) constructing a plurality of line segments from the optical center to a plurality of 3D points in the trained model 3D point cloud or the runtime 3D point cloud at the runtime candidate pose; and
   determining, based upon a location of the 3D points along respective line segments, whether to exclude or include the 3D points in the step of scoring.

2. The method as set forth in claim 1 further comprising, restricting consideration of self-occluding 3D point information free-of explicitly rendering a view of the trained model 3D point cloud at the runtime 3D point cloud candidate pose.

3. The method as set forth in claim 1 wherein the step of scoring includes at least one of (a) computing a coverage score defining a sum of included 3D points and (b) computing a clutter score defining a sum of excluded runtime 3D points.

4. The method as set forth in claim 3 wherein the step of defining the sum of included 3D points includes using at least one of a point-to-plane, point-to-line and point-to-point metric.

5. The method as set forth in claim 1 wherein at least one of (a) the step of scoring includes operating the visibility check incrementally, and (b) the visibility check is performed based upon a range image.

6. The method as set forth in claim 5 wherein the visibility check is performed by testing if the 3D points are visible based upon at least one of (a) an adjacency test and (b) a point-against-surface-mesh test.

7. The method as set forth in claim 1 wherein the 3D camera is part of a 3D camera assembly having a plurality of 3D cameras interconnected to the vision system processor.

8. The method as set forth in claim 7 wherein the runtime 3D point cloud is acquired from an object imaged by at least two of the 3D cameras in which a portion of the object is imaged within the working section of each of the at least two 3D cameras.

9. The method as set forth in claim 1 wherein the runtime 3D point cloud is acquired from an object that is self-occluded within the working section of the 3D camera.

10. A system in a vision system for estimating a degree of match of a 3D alignment pose of a runtime 3D point cloud with respect to a trained model 3D point cloud comprising:
    a scoring process, operating in a vision system processor, that scores a match of a candidate pose of the runtime 3D point cloud relative to the trained model 3D point cloud, including a visibility check process that is arranged to
    (a) receive an optical center of a 3D camera,
    (b) receive the trained model 3D point cloud,
    (c) receive the runtime 3D point cloud, and
    (d) construct a plurality of line segments from the optical center to a plurality of 3D points in the trained model 3D point cloud or the runtime 3D point cloud at the runtime candidate pose; and
    a determination process that, based upon a location of the 3D points along respective line segments, determines whether to exclude or include the 3D points.

11. The system as set forth in claim 10 wherein the scoring process is arranged to (a) compute a coverage score defining a sum of included 3D points and (b) compute a clutter score defining a sum of excluded runtime 3D points.

12. The system as set forth in claim 10 wherein at least one of (a) the scoring process is arranged to operate the visibility check incrementally, and (b) the visibility check process is performed based upon a range image.

13. The system as set forth in claim 12 wherein the visibility check process is performed by testing if the 3D points are visible based upon at least one of (a) an adjacency test and (b) a point-against-surface-mesh test.

14. The system as set forth in claim 13 wherein the test is performed by SIMD machine-accelerated hardware.

15. The system as set forth in claim 10 wherein the 3D camera is part of a 3D camera assembly having a plurality of 3D cameras interconnected to the vision system processor.

16. The system as set forth in claim 15 wherein the runtime 3D point cloud is acquired from an object imaged by at least two of the 3D cameras in which a portion of the object is imaged within the working section of each of the at least two 3D cameras.

17. A system for removing spurious points from a 3D image of an object comprising:
a plurality of 3D cameras arranged to acquire images of an object within a working section thereof from a plurality of respective points of view;
one or more vision system processors configured to operate:
a visibility process that,
(a) receives a measured 3D point cloud from a 3D camera in the plurality of 3D cameras,
(b) generates presumed poses for the object relative to the measured 3D point cloud, and
(c) uses information relative to location and orientation of the 3D camera with respect to the object to determine visibility of points of the 3D point cloud; and
a composite point cloud generation process that combines the 3D point cloud from the plurality of 3D cameras into a composite 3D point cloud free of spurious points by omitting points that are not corroborated by appearing in a predetermined number of point clouds in which such points are expected to be visible, based on the visibility process.

18. The system as set forth in claim 17 wherein the visibility process is based on a respective measured position of the 3D camera and a respective local surface normal for points in the measured 3D point cloud with respect to the 3D camera.

19. The system as set forth in claim 18 wherein the local surface normal is generated based upon nearby points to the point containing the surface normal.

20. The system as set forth in claim 17 wherein the predetermined number of point clouds is defined by an automatic or user-defined threshold.

* * * * *